US008492461B2

(12) United States Patent
Hage et al.

(10) Patent No.: US 8,492,461 B2
(45) Date of Patent: Jul. 23, 2013

(54) LIQUID HARDENING

(71) Applicant: OMG UK Technology Ltd., London (GB)

(72) Inventors: Ronald Hage, Leiden (NL); Philana Veronica Wesenhagen, Weert (NL)

(73) Assignee: OMG UK Technology Ltd., London (GB)

( * ) Notice: Subject to any disclaimer, the term of this patent is extended or adjusted under 35 U.S.C. 154(b) by 0 days.

(21) Appl. No.: 13/654,990

(22) Filed: Oct. 18, 2012

(65) Prior Publication Data

US 2013/0041078 A1 Feb. 14, 2013

Related U.S. Application Data

(60) Continuation of application No. 13/194,262, filed on Jul. 29, 2011, now Pat. No. 8,318,836, which is a division of application No. 12/309,051, filed as application No. PCT/EP2007/056557 on Jun. 29, 2007, now Pat. No. 8,013,044.

(30) Foreign Application Priority Data

Jul. 7, 2006 (EP) .................................... 06253591

(51) Int. Cl.
*C08K 5/00* (2006.01)
*C08K 5/3412* (2006.01)
*C08F 2/38* (2006.01)
*C08F 4/04* (2006.01)
*C08F 4/26* (2006.01)

(52) U.S. Cl.
USPC ............. 524/91; 524/718; 524/720; 524/765; 524/779; 524/780; 524/783; 524/788

(58) Field of Classification Search
USPC .................. 524/91, 718, 720, 765, 779, 780, 524/783, 788
See application file for complete search history.

(56) References Cited

U.S. PATENT DOCUMENTS

| 5,759,252 | A | 6/1998 | Edelmann et al. |
| 6,586,383 | B2 | 7/2003 | Hage et al. |
| 8,013,044 | B2 | 9/2011 | Hage et al. |
| 2001/0008932 | A1 | 7/2001 | Bakkeren et al. |
| 2004/0040468 | A1 | 3/2004 | Nomura et al. |
| 2005/0245639 | A1 | 11/2005 | Oostveen et al. |
| 2011/0003984 | A1 | 1/2011 | Comba et al. |
| 2011/0277665 | A1 | 11/2011 | Hage et al. |

FOREIGN PATENT DOCUMENTS

| DE | 2634085 | | 3/1977 |
| EP | 0909809 | A2 | 4/1999 |
| EP | 0765381 | B1 | 8/1999 |
| EP | 1001009 | A1 | 5/2000 |
| EP | 1259522 | B1 | 9/2003 |
| EP | 1382648 | A1 | 1/2004 |
| EP | 1657359 | A1 | 5/2006 |
| GB | 2386615 | A | 9/2003 |
| WO | 95/34628 | A1 | 12/1995 |
| WO | 9748787 | A1 | 12/1997 |
| WO | 9839098 | A1 | 9/1998 |
| WO | 0011090 | A1 | 3/2000 |
| WO | 0060045 | A1 | 10/2000 |
| WO | 0248301 | A1 | 6/2002 |
| WO | 02077145 | A1 | 10/2002 |
| WO | 03029371 | A1 | 4/2003 |
| WO | 03093384 | A1 | 11/2003 |
| WO | 03104379 | A1 | 12/2003 |
| WO | 2005/042532 | A1 | 5/2005 |
| WO | 2007024592 | A1 | 3/2007 |
| WO | 2008127739 | A1 | 10/2008 |
| WO | 2009010129 | A1 | 1/2009 |
| WO | 2010054461 | A1 | 5/2010 |
| WO | 2010076031 | A1 | 7/2010 |
| WO | 2010101605 | A1 | 9/2010 |
| WO | 2010106033 | A1 | 9/2010 |
| WO | 2011098583 | A1 | 8/2011 |
| WO | 2011098584 | A1 | 8/2011 |
| WO | 2011098587 | A1 | 8/2011 |

OTHER PUBLICATIONS

International Search Report, PCT/EP2007/056557, mailed Dec. 5, 2007, 4 pages.
Van Gorkum and Bouwman, The oxidative drying of alkyd paint catalysed by metal complexes, Coordination Chemistry Reviews, 249, 1709-1728 (2005).
Van Gorkum, "Manganese Complexes as Drying Catalysts for Alkyd Paints, Chapter 1: Alkyd paint and paint driers", Apr. 27 2005, Leiden, p. 34, paragraph 1, XP002413304.
Van Gorkum, "Manganese Complexes as Drying Catalysts for Alkyd Paints, Chapter 4: The synthesis and characterisation of new mixed-ligand manganese and iron complexes with tripodal tetradentate ligands", Apr. 27, 2005, Leiden, pp. 74-103, XP002413305.
Van Gorkum, "Manganese Complexes as Drying Catalysts for Alkyd Paints, Chapter 5, The autoxidation activity of new mixed-ligand manganese and iron complexes with tripodal ligands", Apr. 27, 2005, Leiden, pp. 106-115, XP002413306.
Oyman et al., "A Promising Environmentally-friendly Manganese-based Catalyst for Alkyd Emulsion Coatings," Polymer, vol. 45, pp. 7431-7436 (2004).
Bieleman, Driers, Additives in Plastics and Paints, Chimia, 56, 184 (2002).
Bieleman, Progress in the Development of Cobalt-Free Drier Systems, Macromolecular Symposia, 187, 811 (2002).
Hubin et al., New Iron(II) and Manganese(II) Complexes of Two Ultra-Rigid, Cross-Bridged Tetraazamacrocycles for Catalysis and Biomimicry, Journal of American Chemical Society, 122, 2512-2522 (2000).
Koek et al., Improved syntheses, structures, spectral and electrochemical properties of [MnIII2(μ-O)(μ-O2CMe)2L2] 2+ and [MnIV2(μ-O)3L2]2+ complexes, J. Chem. Soc., Dalton Trans., 353-362 (1996).
Swaraj, Surface Coatings, Science & Technology, Second Edition, John Wiley & Sons, 89 (1996).
Bernal et al., Iron(II) Complexes of Polydentate Aminopyridyl Ligands and an Exchangeable Sixth Ligand; Reactions with Peroxides, J. Chem. Soc., Dalton Trans., 3667-3675 (1995).
Hage et al., "Efficient Manganese Catalysts for Low-Temperature Bleaching", Nature, vol. 369, pp. 637-639 (Jun. 23, 1994).

*Primary Examiner* — Kriellion Sanders
(74) *Attorney, Agent, or Firm* — Hahn, Loeser & Parks, LLP

(57) ABSTRACT

Curing agents for air-drying alkyd-based resins, coatings, such as paint, varnish or wood stain, inks and linoleum floor coverings, based on an iron/manganese complex containing tetradentate, pentadentate or hexadentate nitrogen donor ligands are disclosed.

19 Claims, No Drawings

LIQUID HARDENING

CROSS REFERENCE TO RELATED APPLICATIONS

This application is a continuation of U.S. application Ser. No. 13/194,262, filed Jul. 29, 2011, now U.S. Pat. No. 8,318, 836, which is a divisional of U.S. application Ser. No. 12/309, 051, filed Jan. 5, 2009, now U.S. Pat. No. 8,013,044, issued Sep. 6, 2011, which is the U.S. National Phase under 35 U.S.C. §371 of International Application PCT/EP2007/ 056557, filed Jun. 29, 2007, which claims priority to EP 06253591.9, filed Jul. 7, 2006.

FIELD OF INVENTION

The present invention concerns the curing and hardening of liquids. In particular the present invention relates to the curing and hardening of inks and paints.

BACKGROUND OF INVENTION

Recent reviews describe different alternatives, especially based on Mn and Fe compounds (Bieleman, J. H. in Additives in Plastics and Paints, Chimia, 56, 184 (2002); Bieleman, J. H., Marcomol. Symp., 187, 811 (2002); van Gorkum R, Bouwman E, Coord. Chem. Rev., 249, 1709 (2005)).

WO 03/093384 describes the use of transition-metal salts or complexes based on pyrazoles, aliphatic and aromatic amines, 2,2'-bipyridine, 1,10'-phenanthroline, 1,4,7-trimethyl-1,4,7-triazacyclononane in combination with a reducing agent as drying agent. Especially Fe and Mn salts and complexes were preferred in combination with ascorbic acid or derivatives thereof. WO03/093384 demonstrates that iron compounds have a rather poor activity and hence high dosages are needed to get satisfactory drying activity. A drawback of using iron compounds at high levels is that an unwanted yellowish/brownish colour is imparted to the mix.

SUMMARY OF INVENTION

The present invention concerns settable liquid compositions that contain a siccative and an alkyd-based resin. The siccative is the component of the liquid composition that facilitates drying, curing, setting, or hardening of the composition.

The liquid may be any settable liquid, for example, lacquer, inks and paints. The term paint includes lacquers. The term alkyd-based resin generally refers to polyesters modified with fatty acids. Alkyd-based resins are generally prepared via the condensation polymerisation reaction of three types of monomers: polyalcohols, polybasic acids and fatty acids or triglyceride oils.

We have found active iron and manganese compounds that are active as a siccative at relatively low concentrations.

In one aspect the present invention provides a curable liquid medium comprising:
a) from 1 to 90 wt %, preferably from 20 to 70 wt %, of an alkyd-based resin; and,
b) from 0.0001 to 0.1 wt % of a siccative, wherein the siccative is an iron or manganese complex of a tetradentate, pentadentate or hexadentate nitrogen donor ligand; the tetradentate, pentadentate or hexadentate nitrogen donor ligands are described in detail below.

Preferably the iron or manganese complex is of a tetradentate or pentadentate nitrogen donor ligand. More preferably the iron compound contains a pentadentate nitrogen donor ligand and the manganese compound a tetradentate nitrogen donor ligand.

In another aspect the present invention provides the composition of the present invention after curing.

DETAILED DESCRIPTION OF INVENTION

The present invention relates to a siccative for alkyd-based resins, coatings, inks, and linoleum floor coverings, comprising an iron or manganese complex containing a tetradentate, pentadentate or hexadentate nitrogen donor ligand. Whilst certain paints/inks contain unsaturated oils/acids as crosslinking agent, most of them contain alkyd-based resins that contain unsaturated groups. The alkyd-based air-drying coatings to which the siccative of the present invention can be added, comprise coatings, such as paint, varnish or wood stain, and also includes inks and linoleum floor coverings and the like. The siccative is equally applicable to setting paints/ inks/print which do not contain alkyd-based resins, but do contain at least 2% of double or triple unsaturated compound.

The coatings, inks, and linoleum floor coverings may also include compositions wherein besides the alkyd based binder also other binders are present, e.g. compositions comprising 1) an alkyd-based binder and 2) a polyacrylate and/or a polyurethane binder. Conventional air-drying alkyds can be obtained by a polycondensation reaction of one or more polyhydric alcohols, one or more polycarboxylic acids or the corresponding anhydrides, and long chain unsaturated fatty acids or oils.

Due to its presence in naturally occurring oils, glycerol is a widely encountered polyol. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane and 1,6-hexane diol. Polycarboxylic acids and the corresponding anhydrides, used to synthesise alkyds, comprise aromatic, aliphatic and cycloaliphatic components, which are generally derived from petrochemical feedstocks. Typical examples of such polyacids include: phthalic acid and its regio-isomeric analogues, trimellitic acid, pyromellitic acid, pimelic acid, adipic acid, azelaic acid, sebacic acid, maleic acid, fumaric acid and tetra-hydrophthalic acid.

Suitable drying fatty acids, semi-drying fatty acids or mixture thereof, useful herein, are ethylenically unsaturated conjugated or non-conjugated $C_2$-$C_{24}$ carboxylic acids, such as oleic, ricinoleic, linoleic, linolenic, licanic acid and eleostearic acids or mixture thereof, typically used in the form of mixtures of fatty acids derived from natural or synthetic oils. By semi-drying and drying fatty acids is meant fatty acids that have the same fatty acid composition as the oils they are derived from. The classification of the oils is based on the iodine number; for drying oil the iodine number is >140; for semi-drying oil the iodine number is ranging between 125 and 140, and for non-drying oil the iodine number is <125 ("Surface Coatings", by Swaraj Paul, John Wiley and Sons; p. 89). Suitable organic solvents to dilute the air-drying alkyds of the invention include aliphatic, cycloaliphatic and aromatic hydrocarbons, alcohol ethers, alcohol esters and N-methylpyrrolidone. However it may also be an aqueous carrier containing the alkyd resin in the form of an emulsion and a suitable emulsifier as is well known in the art.

An ink of the present invention containing an alkyd varnish, modified with unsaturated fatty acids, as defined above, as a vehicle component of the ink is usable, but not limited to, as a metal plate ink, lithographic ink, relief printing ink, screen ink or offset overprinting ink.

The siccative will preferably be partly or completely dissolved in the alkyd resin, emulsion etc. The catalytic activity of the transition metal ion depends upon the ion itself and on the type of ligands employed, as disclosed herein. The siccative may also be dosed to the composition just prior the use of the composition.

The composition of the present invention can, if desired or if necessary, also comprise other additives such as other siccatives.

The invention is also an air-drying alkyd-based coating, resin, ink, or floor covering comprising a siccative according to the invention, e.g. containing from 0.00001 to 0.1 wt % (based on the amount of binder; this will be generally 5 to 50 times higher than when metal-based, depending on the molecular weight of the compound defined herein) of the iron or manganese complex containing a tetradentate, pentadentate or hexadentate nitrogen donor. The air-drying alkyd-based coating, resin, ink, or floor covering may further comprise a polyacrylate and/or a polyurethane binder.

The composition of the present invention may contain colourants, pigment, anti-corrosive pigment, and/or extender pigment and/or a dye. It may further contain, if necessary, plasticizer, surface-controlling agents, anti-silking agent, a defoaming agent, a rheological controlling agent and/or an ultraviolet absorber.

The addition of the siccative itself is done with conventional techniques, known to the person skilled in the art. The siccative is either added during the production of the alkyd based resins, coatings, inks, and linoleum floor coverings, or is added under stirring to them before use.

The composition of the present invention is preferably stored under an inert atmosphere, for example nitrogen or carbon dioxide.

Stability Agents

The composition of the present invention preferably comprises an antioxidant in the range 0.001% to 0.1%, most preferably 0.002 and 0.05%. Suitable antioxidants are disclosed in U.S. Pat. No. 6,586,383. Most preferably the antioxidant is selected from the group consisting of: di-tert-butyl hydroxy toluene, ethoxyquine, α-tocopherol, and 6-hydroxy-2,5,7,8-tetra-methylchroman-2-carboxylic acid.

The composition of the present preferably comprises ethyleneglycol and/or glycerol in the range 0.1 and 50 wt %, preferably 0.3 and 5 wt %.

Siccative

Preferably, the siccative is present in the a curable liquid medium from 0.0001 and 0.1% w/w, more preferably from 0.001 and 0.1% w/w and most preferably from 0.002 and 0.05% w/w.

The tetradentate, pentadentate or hexadentate nitrogen donor ligand may be built up within any organic structure which will support coordinating nitrogen atoms. For example one can take a basic tridentate ligand such as 1,4,7-triazacyclononane and have further nitrogen co-ordination groups, e.g., —CH2-CH2-NH2, —CH2-Py, covalently bound to one or more of the cyclic nitrogens or aliphatic groups.

Preferably the iron ion is selected from Fe(II) and Fe(III) and the manganese ion is selected from Mn(II), Mn(III), and Mn(IV).

Preferably the ligand is present in one or more of the forms [MnLCl$_2$]; [FeLCl$_2$]; [FeLCl]Cl; [FeL(H$_2$O)](PF$_6$)$_2$; [FeL]Cl$_2$, [FeLCl]PF$_6$ and [FeL(H$_2$O)](BF$_4$)$_2$.

The following are preferred classes of siccative that are iron or manganese complexes of tetradentate, pentadentate or hexadentate nitrogen donor ligands.

If unspecified the length of any alkyl chain is preferably C1 to C8-alkyl chain and preferably linear. If unspecified the aryl group is a phenyl group.

Bispidon

The bispidon class are preferably in the form of an iron transition metal catalyst.

The bispidon ligand is preferably of the form:

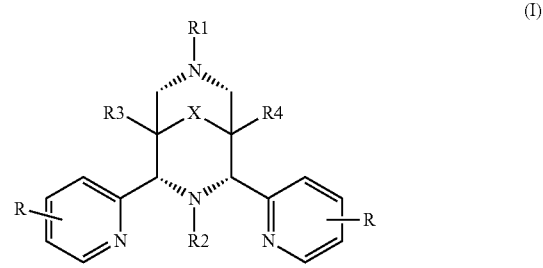

(I)

wherein each R is independently selected from: hydrogen, F, Cl, Br, hydroxyl, C1-C4-alkylO—, NH—CO—H, —NH—CO—C1-C4 alkyl, —NH2, —NH—C1-C4-alkyl, and C1-C4-alkyl;

R1 and R2 are independently selected from:
C1-C24-alkyl,
C6-C10-aryl, and,
a group containing a heteroatom capable of coordinating to a transition metal;

R3 and R4 are independently selected from hydrogen, C1-C8 alkyl, C1-C8-alkyl-O—C1-C8-alkyl, C1-C8-alkyl-O—C6-C10-aryl, C6-C10-aryl, C1-C8-hydroxyalkyl, and —(CH2)$_n$C(O)OR5 wherein R5 is independently selected from: hydrogen, C1-C4-alkyl, n is from 0 to 4, and mixtures thereof; and, X is selected from C=O, —[C(R6)$_2$]$_y$-wherein Y is from 0 to 3 each R6 is independently selected from hydrogen, hydroxyl, C1-C4-alkoxy and C1-C4-alkyl.

Preferably R3=R4 and selected from —C(O)—O—CH3, —C(O)—O—CH2CH3, —C(O)—O—CH2 C6H5 and CH2OH.

Preferably the heteroatom capable of coordinating to a transition metal is pyridin-2-ylmethyl optionally substituted by —C0-C4-alkyl.

Preferably X is C=O or C(OH)2.

Preferred groups for R1 and R2 are CH3, —C2H5, —C3H7, benzyl, —C4H9, —C6H13, —C8H17, —C12H25, and —C18H37 and pyridin-2-yl. A preferred class of bispidon is one in which at least one of R1 or R2 is pyridin-2-ylmethyl or benzyl, preferably pyridin-2-ylmethyl.

A preferred bispidon is dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-C1) and the iron complex thereof. FeN2py3o-C1 which was prepared as described in WO02/48301. Other preferred bispidons are one in which instead of having a methyl group (C1) at the 3 position have longer alkyl chains, namely isobutyl, (n-hexyl) C6, (n-octyl) C8, (n-dodecyl) C12, (n-tetradecyl) C14, (n-octadecyl) C18, which were prepared in an analogous manner.

Preferred tetradentate bispidons are also illustrated in WO00/60045 and preferred pentadentate bispidons are illustrated in WO02/48301 and WO03/104379.

N4py Type

The N4py are preferably in the form of an iron transition metal catalyst.

The N4py type ligands are preferably of the form:

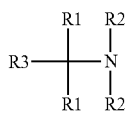

(II)

wherein
each $R^1$, $R^2$ independently represents —$R^4$-$R^5$,
$R^3$ represents hydrogen, optionally substituted alkyl, aryl or arylalkyl, or —$R^4$-$R^5$,
each $R^4$ independently represents a single bond or optionally substituted alkylene, alkenylene, oxyalkylene, aminoalkylene, alkylene ether, carboxylic ester or carboxylic amide, and
each $R^5$ independently represents an optionally N-substituted aminoalkyl group or an optionally substituted heteroaryl group selected from pyridinyl, pyrazinyl, pyrazolyl, pyrrolyl, imidazolyl, benzimidazolyl, pyrimidinyl, triazolyl and thiazolyl.

Preferably $R^1$ represents pyridin-2-yl or $R^2$ represents pyridin-2-ylmethyl. Preferably $R^2$ or $R^1$ represents 2-aminoethyl, 2-(N-(m)ethyl)amino-ethyl or 2-(N,N-di(m)ethyl)amino-ethyl. If substituted, $R^5$ preferably represents 3-methylpyridin-2-yl. $R^3$ preferably represents hydrogen, benzyl or methyl.

The preferred ligands are N4Py (i.e. N,N-bis(pyridin-2-ylmethyl)-bis(pyridin-2-yl)methylamine) which is disclosed in WO95/34628 and MeN4Py (i.e. N,N-bis(pyridin-2-ylmethyl)-1,1-bis(pyridin-2-yl)-1-aminoethane, as disclosed in EP0909809.

TACN-Nx
The TACN-Nx are preferably in the form of an iron transition metal catalyst.
The ligands possess the basic 1,4,7-triazacyclononane structure but have one or more pendent nitrogen groups that complex with the transition metal to provide a tetradentate, pentadentate or hexadentate ligand. Preferably, the basic 1,4,7-triazacyclononane structure has two pendent nitrogen groups that complex with the transition metal (TACN-N2).
The TACN-Nx is preferably of the form:

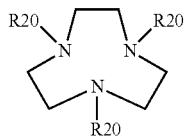

(III)

wherein each R20 is selected from: an alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and $N^+(R21)_3$, wherein R21 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —$CY_2$—R22, in which Y is independently selected from H, CH3, C2H5, C3H7 and R22 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl; and wherein at least one of R20 is a —$CY_2$—R22.

Preferably R22 is selected from optionally substituted pyridin-2-yl, imidazol-4-yl, pyrazol-1-yl, quinolin-2-yl groups. Most preferably R22 is either a pyridin-2-yl or a quinolin-2-yl.

Cyclam and Cross Bridged Ligands
The cyclam and cross bridged ligands are preferably in the form of a manganese transition metal catalyst.
The cyclam ligand is preferably of the form:

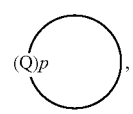

(IV)

wherein:
Q is independently selected from:

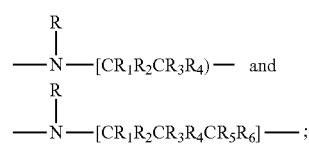

p is 4;
R is independently selected from: hydrogen, C1-C6-alkyl, CH2CH2OH, pyridin-2-ylmethyl, and CH2COOH, or one of R is linked to the N of another Q via an ethylene bridge;
R1, R2, R3, R4, R5 and R6 are independently selected from: H, C1-C4-alkyl, and C1-C4-alkylhydroxy.

Preferred non-cross-bridged ligands are 1,4,8,11-tetraazacyclotetradecane (cyclam), 1,4,8,11-tetramethyl-1,4,8,11-tetraazacyclotetradecane (Me4cyclam), 1,4,7,10-tetraazacyclododecane (cyclen), 1,4,7,10-tetramethyl-1,4,7,10-tetraazacyclododecane (Me4 cyclen), and 1,4,7,10-tetrakis(pyridine-2ylmethyl)-1,4,7,10-tetraazacyclododecane (Py4 cyclen). With Py4 cyclen the iron complex is preferred.

A preferred cross-bridged ligand is of the form:

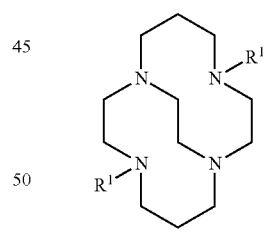

(V)

wherein "$R^1$" is independently selected from H, and linear or branched, substituted or unsubstituted C1 to C20 alkyl, alkylaryl, alkenyl or alkynyl; and all nitrogen atoms in the macropolycyclic rings are coordinated with the transition metal.

Preferably R1=Me, which is the ligand 5,12-dimethyl-1,5,8,12-tetraaza-bicyclo[6.6.2]hexadecane of which the complex [Mn(Bcyclam)Cl$_2$] may be synthesised according to WO98/39098.

Other suitable crossed bridged ligands are also found in WO98/39098.

Trispicen-Type
The trispicens are preferably in the form of an iron transition metal catalyst.

The trispicen type ligands are preferably of the form:

R17R17N—X—NR17R17 (VI), wherein:
X is selected from —CH2CH2-, —CH2CH2CH2-, —CH2C(OH)HCH₂—; and,
R17 independently represents a group selected from: R17 and alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and $N^+(R19)_3$, wherein R19 is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —CY₂—R18, in which Y is independently selected from H, CH3, C2H5, C3H7 and R18 is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl;
and wherein at least two of R17 are —CY₂—R18.

The heteroatom donor group is preferably pyridinyl optionally substituted by —C0-C4-alkyl.

Other preferred heteroatom donor groups are imidazol-2-yl, 1-methyl-imidazol-2-yl, 4-methyl-imidazol-2-yl, imidazol-4-yl, 2-methyl-imidazol-4-yl, 1-methyl-imidazol-4-yl, benzimidazol-2-yl and 1-methyl-benzimidazol-2-yl.

Preferably three of R17 are CY₂—R18.

The ligand Tpen (i.e. N,N,N',N'-tetra(pyridin-2-ylmethyl) ethylenediamine) is disclosed in WO97/48787.

The following are preferred trispicens: N-methyl-tris(pyridin-2-ylmethyl)ethylene-1,2-diamine; N-octyl-tris(pyridin-2-ylmethyl)ethylene-1,2-diamine; N-octadecyl-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethyl ene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethyl ene-1,2-diamine; N-butyl-N,N',N'-tris(pyridin-2-ylmethyl)ethyl ene-1,2-diamine; N-octyl-N,N',N'-tris(pyridin-2-ylmethyl)ethyl ene-1,2-diamine; N-dodecyl-N,N',N'-tris(pyridin-2-ylmethyl)ethyl ene-1,2-diamine; N-octadecyl-N,N',N'-tris(pyridin-2-ylmethyl)ethyl ene-1,2-diamine; N-Methyl-N,N',N'-Tris(imidazol-2ylmethyl)-ethylenediamine; N-ethyl-N,N',N'-Tris(imidazol-2yl methyl)-ethylenediamine; N,N'-dimethyl-N,N'-bis(imidazol-2-ylmethyl)-ethylenediamine; N-(1-propan-2-ol)-N,N',N'-Tris(imidazol-2ylmethyl)-ethylenediamine; N-(1-propan-2-ol)-N,N',N'-Tris(1-methyl-imidazol-2ylmethyl)-ethylenediamine; N,N-diethyl-N',N'',N''-Tris(5-methyl-imidazol-4ylmethyl)-diethylenetriamine; N-(3-propan-1-ol)-N,N',N'-Tris(1-methyl-imidazol-2-ylmethyl)-ethylenediamine; N-hexyl-N,N',N'-Tris(imidazol-2ylmethyl)-ethylenediamine; N-methyl-N,N',N'-tris(benzimidazol-2ylmethyl)-ethylenediamine; and, N-(3-propan-1-ol)methyl-N,N',N'-tris(benzimidazol-2-ylmethyl)-ethylenediamine.

Other suitable trispicens are found in WO02/077145.

Of the non-bispidon type siccatives the following are most preferred:
5,12-dimethyl-1,5,8,12-tetraaza-bicyclo[6.6.2]hexadecane, 5,12-dibenzyl-1,5,8,12-tetraaza-bicyclo[6.6.2]hexadecane, 1,4,8,11-tetraazacyclotetradecane, 1,4,8,11-tetramethyl-1,4,8,11-tetraazacyclotetradecane, 1,4,7,10-tetraazacyclododecane, 1,4,7,10-tetramethyl-1,4,7,10-tetraazacyclododecane, and 1,4,7,10-tetrakis(pyridin-2-ylmethyl)-1,4,7,10-tetraazacyclododecane, N,N-bis(pyridin-2-ylmethyl)-bis(pyridin-2-yl)methylamine, N,N-bis(pyridin-2-ylmethyl)-1,1-bis(pyridin-2-yl)-1-aminoethane, N,N,N',N'-tetra(pyridin-2-ylmethyl)ethylenediamine, N-methyl-tris(pyridin-2-ylmethyl)ethylene-1,2-diamine; N-butyl-N,N',N'-tris(pyridin-2-ylmethyl)ethylene-1,2-diamine; N-octyl-N,N',N'-tris(pyridin-2-ylmethyl)ethylene-1,2-diamine; N-dodecyl-N,N',N'-tris(pyridin-2-ylmethyl)ethylene-1,2-diamine; N-octadecyl-N,N',N'-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-methyl-N,N',N'-tris(imidazol-2-ylmethyl)-ethylenediamine; N-ethyl-N,N',N'-tris(imidazol-2-ylmethyl)-ethylenediamine; N,N'-dimethyl-N,N'-bis(imidazol-2-ylmethyl)-ethylenediamine; N-(1-propan-2-ol)-N,N',N'-tris(imidazol-2-ylmethyl)-ethylenediamine; N-(1-propan-2-ol)-N,N',N'-tris(1-methyl-imidazol-2-ylmethyl)-ethylenediamine; N,N-diethyl-N',N'',N''-tris(5-methyl-imidazol-4-ylmethyl)-diethylenetriamine; N-(3-propan-1-ol)-N,N',N'-tris(1-methyl-imidazol-2-ylmethyl)-ethylenediamine; N-hexyl-N,N',N'-tris(imidazol-2-ylmethyl)-ethylenediamine; N-methyl-N,N',N'-tris(benzimidazol-2-ylmethyl)-ethylenediamine; and, N-(3-propan-1-ol)methyl-N,N',N'-tris(benzimidazol-2-ylmethyl)-ethylenediamine; 1,4-bis(quinolin-2-ylmethyl)-7-octyl-1,4,7-triazacyclononane; 1,4-bis(quinolin-2-ylmethyl)-7-ethyl-1,4,7-triazacyclononane; 1,4-bis(quinolin-2-ylmethyl)-7-methyl-1,4,7-triazacyclononane; 1,4-bis(pyridyl-2-methyl)-7-octyl-1,4,7-triazacyclononane; 1,4-bis(pyridyl-2-methyl)-7-ethyl-1,4,7-triazacyclononane; 1,4-bis(pyridyl-2-methyl)-7-methyl-1,4,7-triazacyclononane; 1,4-bis(pyrazol-1-ylmethyl)-7-octyl-1,4,7-triazacyclononane; 1,4-bis(pyrazol-1-ylmethyl)-7-ethyl-1,4,7-triazacyclononane; 1,4-bis(pyrazol-1-ylmethyl)-7-methyl-1,4,7-triazacyclononane, 3,5-dimethylpyrazol-1-ylmethyl)-7-octyl-1,4,7-triazacyclononane; 3,5-dimethylpyrazol-1-ylmethyl)-7-ethyl-1,4,7-triazacyclononane; 3,5-dimethylpyrazol-1-ylmethyl)-7-methyl-1,4,7-triazacyclononane; 1,4-bis(1-methylimidazol-2-ylmethyl)-7-octyl-1,4,7-triazacyclononane; 1,4-bis(1-methylimidazol-2-ylmethyl)-7-ethyl-1,4,7-triazacyclononane; 1,4-bis(1-methylimidazol-2-ylmethyl)-7-methyl-1,4,7-triazacyclononane; and, 1,4,7-tris(quinolin-2-ylmethyl)-1,4,7-triazacyclononane; 1,4,7-tris(pyridin-2-ylmethyl)-1,4,7-triazacyclononane.

EXAMPLES

Cobalt(II) 2-ethylhexanoate (65 wt. % solution in mineral spirits) was obtained from Aldrich.

Dimethyl 2,4-di-(2-pyridyl)-3-methyl-7-(pyridin-2-ylmethyl)-3,7-diaza-bicyclo[3.3.1]nonan-9-one-1,5-dicarboxylate (N2py3o-C1) and the iron(II) complex thereof [Fe (N2py3o-C1)Cl]Cl was prepared as described in WO0248301.

Dimethyl 2,4-di-(2-pyridyl)-3-octyl-7-(pyridin-2-ylmethyl)-3,7-diaza-bicyclo[3.3.1]nonan-9-one-1,5-dicarboxylate (N2py3o-C8) and Dimethyl 2,4-di-(2-pyridyl)-3-octadecyl-7-(pyridin-2-ylmethyl)-3,7-diaza-bicyclo[3.3.1]nonan- 9-one-1,5-dicarboxylate (N2py3o-C18) and the corresponding iron complexes, [Fe(N2py3o-C8)Cl]Cl and [Fe(N2py3o-C18)Cl]Cl, were prepared as described in WO 2005042532.

N,N-bis(pyridin-2-ylmethyl)-bis(pyridin-2-yl)methylamine, hereafter referred to as N4Py, and the corresponding iron(II) complex, [Fe(N4py)Cl]Cl, were prepared as described in EP0765381.

N,N-bis(pyridin-2-ylmethyl)-1,1-bis(pyridin-2-yl)-1-aminoethane, hereafter referred to as MeN4Py, and the corresponding iron(II) complex, [Fe(MeN4Py)Cl]Cl, were prepared as described in EP0909809.

4,11-dimethyl-1,4,8,11-tetraazabicyclo[6.6.2]hexadecane, hereafter referred to as Bcyclam, and the corresponding manganese(II) complex, [Mn(Bcyclam)Cl$_2$], were prepared as described in WO98/39098 and J. Am. Chem. Soc., 122, 2512 (2000)).

N-methyl-trispicen (Metrispicen), N-octyl-trispicen (C8-trispicen), N-octadecyl-trispicen (C18-trispicen) were synthesised according to literature procedures (Bernal, J.; et al. J. Chem. Soc., Dalton Trans. 1995, 3667) and GB2386615. The corresponding iron(II) complexes, [Fe(Metrispicen)Cl]Cl, [Fe(C8-trispicen)Cl]Cl, and [Fe(C18-trispicen)Cl]Cl, were prepared similarly to the procedure described in EP0909809 for the MeN4py analog.

1,4-bis(quinolin-2-ylmethyl)-7-ethyl-1,4,7-triazacyclononane (Quin$_2$TACN) and the corresponding [Fe(Quin$_2$TACN)Cl]ClO$_4$ compound were prepared as disclosed in EP1259522.

Mn$_2$($\mu$-O)$_3$(1,4,7-trimethyl-1,4,7-triazacyclononane)$_2$]PF$_6$)$_2$ was prepared as published elsewhere (J. Chem. Soc., Dalton Trans, 353 (1996)).

Experiment 1

Homogeneous Bleaching of α-Carotene in Hexane with Methyllinoleate

This experiment was done to show that the β-carotene can be degraded by interaction of the various iron and manganese catalysts with methyllinoleate, as an indicator for radical reactions (which in turn should lead to increased rate of paint/ink drying).

UV/VIS experiments were performed on a Hewlett Packard 8453 apparatus. All the experiments were performed at 35° C. and measurements were conducted over a period of 1 hour in the UV/VIS kinetic mode. The assays were done in a quartz cuvette and were shaken thoroughly before starting the measurements. The stopper was removed from the cuvettes during measurements.

The hexane solutions contained 85.6 μM β-carotene, 6.0 mM methyllinoleate, approximately 5 μM of the catalyst and 3.1% (v/v) ethanol. The initial absorbance at 452 nm was about 0.45 A.U. The difference between the initial absorbance and absorbance after 600 seconds in each case is given in table 1. A higher value indicates a higher β-carotene bleaching activity.

TABLE 1

Homogeneous bleaching experiments using β-carotene and methyllinoleate in combination with 5 μM of each catalyst.

|  | ΔA452 nm (600 s) |
|---|---|
| Blank (no catalyst added) | 0.01 |
| [Fe(N2py3o-C1)Cl]Cl | 0.08 |

TABLE 1-continued

Homogeneous bleaching experiments using β-carotene and methyllinoleate in combination with 5 μM of each catalyst.

|  | ΔA452 nm (600 s) |
|---|---|
| [Fe(N2py3o-C8)Cl]Cl | 0.11 |
| [Fe(N2py3o-C18)Cl]Cl | 0.10 |
| [Fe(MeN4py)Cl]Cl | 0.06 |
| [Mn(Bcyclam)Cl$_2$] | 0.07 |
| [Fe(Metrispicen)Cl]Cl | 0.03 |
| [Fe(C8-trispicen)Cl]Cl | 0.06 |
| [Fe(C18-trispicen)Cl]Cl | 0.08 |
| [Fe(Quin$_2$TACN)Cl]ClO$_4$ | 0.06 |
| Cobalt(II)-(2-ethylhexanoate)$_2$ | 0.01 |

The results presented in table 1 clearly indicate that the iron and manganese compounds disclosed in this invention furnish a significant enhancement of β-carotene bleaching with methyllinoleate.

Experiment 2

Drying Time of Linseed Oil Paint

A solvent borne model (linseed oil in n-heptane) is used for alkyd based systems. All experiments were performed at room temperature and films were made on a petridish. The starting catalyst concentrations that were used were between 0.016 mM and 0.32 mM as exemplified in Table 2. Co(II)-2-ethylhexanoate (1.63 mM) and a blank (linseed oil/heptane 50/50 v/v) were also incorporated for comparison.

The film on the petridish consisted of 100 μl (50/50 v/v linseed/n-heptane) and 25 μl catalyst solution in ethanol (vide supra for final concentrations in linseed oil/heptane solutions).

The results of the tested iron and manganese complexes are shown in table. In all cases, the time needed to establish tack-free drying is given in the table. Films were classified as tack free when they gave a straight line when a pin was run through the film, but a fingerprint was still visible on the film. Through-dry indicates that the coating was hard and no print was visible anymore. A lower value indicates a faster drying time. Different concentrations of drying catalysts were taken, to establish the lowest level that still can attain an equal or better drying than the cobalt salt.

TABLE 2

Drying times to need tack free or completely dry linseed paint with different compounds and levels.

|  | Starting Concentration | Concentration in film (μg/100 μl linseed) | Tack free drying time (h) |
|---|---|---|---|
| Blank | — | — | >120 |
| Cobalt(II)-(2-ethylhexanoate)$_2$ | 1.63 mM | 22 | 28 |
| [Fe(N2py3o-C1)Cl]Cl | 0.064 mM | 1.0 | 20 |
| [Fe(N2py3o-C1)Cl]Cl | 0.016 mM | 0.26 | 28 |
| [Fe(N2py3o-C8)Cl]Cl | 0.064 mM | 1.2 | 20 |
| [Fe(N2py3o-C8)Cl]Cl | 0.032 mM | 0.61 | 28 |
| [Fe(N2py3o-C18)Cl]Cl | 0.064 mM | 1.4 | 20 |
| [Fe(N2py3o-C18)Cl]Cl | 0.032 mM | 0.7 | 28 |
| [Fe(N4py)Cl]Cl | 0.32 mM | 4 | 22 (through dry) |
| [Fe(MeN4py)Cl]Cl | 0.064 mM | 0.8 | 20 |
| [Fe(MeN4py)Cl]Cl | 0.016 mM | 0.2 | 27 |
| [Mn(Bcyclam)Cl$_2$] | 0.32 mM | 3.1 | 20 (through dry) |

TABLE 2-continued

Drying times to need tack free or completely dry linseed paint with different compounds and levels.

| Starting Concentration | Concentration in film (µg/100 µl linseed) | Tack free drying time (h) |
|---|---|---|

The results presented in the table clearly show that these iron and manganese compounds are much more active on molar basis than the reference, i.e. Cobalt(II)-(2-ethylhexanoate)$_2$. Especially [Fe(N2py3o-C1)Cl]Cl and [Fe(MeN4py)Cl]Cl show an improvement of a factor of 100 on molar basis compared to the Co-ethylhexanoate drier.

TABLE 3

Drying times to need tack free or completely dry linseed paint with [Mn(Bcyclam)Cl$_2$] and Mn$_2$(µ-O)$_3$(1,4,7-trimethyl-1,4,7-triazacyclononane)$_2$]PF$_6$)$_2$ (abbr. as Mn—Me3TACN)

| | Starting Concentration | Tack free drying time (h) |
|---|---|---|
| Blank | — | >120 |
| Cobalt (II)-(2-ethylhexanoate)$_2$ | 1.63 mM | 28 |
| [Mn(Bcyclam)Cl$_2$] | 2.5 mM | 6 (tack free) |
| [Mn(Bcyclam)Cl$_2$] | 0.5 mM | 10 (tack free) |
| Mn—Me3TACN | 0.5 mM | 20 (tack free) |
| [Mn(Bcyclam)Cl$_2$] | 0.2 mM | 20 (tack free) |
| Mn—Me3TACN | 0.2 mM | 23 (tack free) |

The data shown in table 3 show that [Mn(Bcyclam)Cl$_2$] exhibits a significantly higher activity than Mn-Me3tacn, exemplifying that the manganese complex with a tetradentate nitrogen donor ligand shows a faster paint drying activity than a manganese complex containing the tridentate triazacyclononane ligand.

Experiment 3

Storage Stability of Catalysts in Linseed Oil Paint in the Presence of (+)-α-Tocopherol (Vitamin E), Purchased from Sigma The drying activity of the [Fe(MeN4py)Cl]Cl and [Fe(N2py3o-C18)Cl]Cl were monitored in the presence of (+)-α-tocopherol (Vitamin E)

An oil-paint sample based on linseed was prepared containing 4 ml linseed, 3820 µl n-heptane, 80 µl (10 mM (+)-α-tocopherol in heptane) and 100 µl catalyst solution in ethanol. As a reference an oil-paint sample without (+)-α-tocopherol is included containing 4 ml linseed, 3.9 ml n-heptane and 100 µl catalyst solution in ethanol. The oil-paint samples were stored in closed glass vials under ambient conditions. Films were painted, each with a separate brush, on a wooden board after certain storage periods. The drying time was monitored and the results are summarised in table 4 and 5.

TABLE 4

Drying activity of 0.004% wt. [Fe(MeN4py)Cl]Cl (0.0004% based on Fe metal) in the absence and presence of 0.009% wt. α-tocopherol in the formulation after different times of storage at room temperature. The amount catalyst dosed is based on the amount in the linseed oil (and not on the linseed oil/heptane mixture).

| Storage time (days) | Without α-tocopherol drying time | With α-tocopherol drying time |
|---|---|---|
| 0 | <20 h | <19 h |
| 3 | <20 h | n.d. |
| 5 | 25 h | n.d. |
| 6 | n.d. | <22 h |
| 10 | >30 h; <46 h | n.d. |
| 11 | n.d. | >24 h; <28 h |

TABLE 5

Drying activity of 0.006% [Fe(N2py3o-C18)Cl]Cl (0.0004% based on Fe metal) in the absence and presence of 0.009% α-tocopherol in the formulation after storage at room temperature. The amount catalyst dosed is based on the amount in the linseed oil (and not on the linseed oil/heptane mixture).

| Storage time (days) | Without α-tocopherol Tack free drying time | With α-tocopherol Drying time |
|---|---|---|
| 0 | 22 h | 22 h |
| 3 | 24 h | n.d. |
| 5 | 25 h | n.d. |
| 6 | n.d. | 22 h |
| 10 | 30 h | n.d. |
| 11 | n.d. | 22 h |

The results shown in tables 3 and 4 indicate that the presence of α-tocopherol retards the decreased linseed oil drying activity of the catalysts.

Experiment 4

Storage Stability of Catalysts in Linseed Oil Paint Under Nitrogen Vs Atmospheric Conditions Oil-paint samples based on raw linseed oil and n-heptane were prepared in glass vials (50/50 v/v) and stored under nitrogen. [Fe(MeN4py)Cl]Cl was present in 0.004 weight % (0.0004% based on Fe metal)—added as a solution in ethanol and α-tocopherol was present in 0.009 weight % (added as a solution in n-heptane). The level dosed of [Fe(MeN4py)Cl]Cl is based on the weight of the compound. Similarly, experiments were conducted using 0.005% [Fe(N2py3o-C1)Cl]Cl (0.0004% based on Fe metal)—added as a solution in ethanol. The amount catalyst dosed is based on the amount in the linseed oil (and not on the linseed oil/heptane mixture).

The oil-paint samples were purged with nitrogen every time the glass vials were opened. After certain storage periods the samples were painted on a wooden board and the drying time was monitored. The drying times are summarised in table 6 and 7 for [Fe(MeN4py)Cl]Cl and [Fe(N2py3o-C1)Cl]Cl respectively.

TABLE 6

Drying activity of 0.004% [Fe(MeN4py)Cl]Cl (0.0004% based on Fe metal) stored under ambient atmospheric conditions and under nitrogen. The amount catalyst dosed is based on the amount in the linseed oil (and not on the linseed oil/heptane mixture). Entries 2 and 4 show the times needed to achieve drying in the presence of 0.009% α-tocopherol in the formulation.

| Storage time (days) | Stored under ambient atmospheric conditions Drying time | Stored under nitrogen drying time |
|---|---|---|
| 0 (without tocopherol) | <20 h | Not determined |
| 0 (with tocopherol) | <19 h | Not determined |
| 30 (without tocopherol) | More than 32 h, but less than 47 | 29 h |
| 30 (with tocopherol) | More than 30 h, but less than 46 h | 29 h |

TABLE 7

Storage stability of 0.005% [Fe(N2py3o-C1)Cl]Cl (0.0004% based on Fe metal) stored under ambient atmospheric conditions and under nitrogen. The amount catalyst dosed is based on the amount in the linseed oil (and not on the linseed oil/heptane mixture). Entries 2 and 4 show the times needed to achieve drying in the presence of 0.009% α-tocopherol in the formulation.

| Storage time (days) | Stored under ambient atmospheric conditions Drying time | Stored under nitrogen Drying time |
|---|---|---|
| 0 (without tocopherol | <19 h | Not determined |
| 0 (with tocopherol) | <19 h | Not determined |
| 30 (without tocopherol | 32 h | 24 h |
| 30 (with tocopherol) | 28 h | 26 h |

The results in table 5 and 6 illustrate that nitrogen also retards the decreased linseed oil drying activity of the catalysts.

Experiment 5

Storage Stability of Catalysts in Linseed Oil Paint in the Presence of Ethylene Glycol Oil-paint samples based on linseed and n-heptane (700 μl; 50/50 v/v) were prepared containing 0.005% [Fe(MeN4py)Cl]Cl (0.0005% based on Fe metal) added as a solution in ethylene glycol (100 μl). The tack free drying time of this sample is compared with the tack free drying time of a sample to which 0.005% [Fe(MeN4py)Cl]Cl (0.0005% based on Fe metal) is added as a solution in ethanol (table 7). The amount catalyst dosed is based on the amount in the linseed oil (and not on the linseed oil/heptane mixture).

After certain storage periods the samples were painted on a wooden board and the drying time was monitored (table 8).

TABLE 8

Storage stability of 0.005% [Fe(MeN4py)Cl]Cl (0.0005% based on Fe metal) in dissolved in ethanol (left) and ethylene glycol (right) and added to the linseed oil after different times of storage at room temperature.

| Storage time (days) | Catalyst dissolved in ethanol Tack free drying time | Catalyst dissolved in ethylene glycol Tack free drying time |
|---|---|---|
| 0 | <20 h | <16 h |
| 31 | 29 h | <20 h |

The data shown in table 7 clearly show that the presence of ethylene glycol over ethanol largely retards the decreased linseed oil drying activity.

What is claimed is:

1. A curable liquid medium comprising:
   a) from 1 to 90 wt % of an alkyd-based resin; and,
   b) from 0.0001 to 0.1 wt % of a siccative, wherein the siccative is an iron or manganese complex of a tetradentate, pentadentate or hexadentate nitrogen donor ligand, wherein the ligand is:

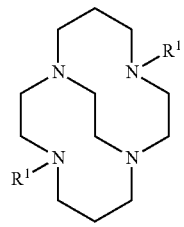

(i)

wherein "$R^1$" is independently selected from H, and linear or branched, substituted or unsubstituted C1 to C20 alkyl, alkylaryl, alkenyl or alkynyl; and
wherein all nitrogen atoms in the macropolycyclic rings are coordinated with the transition metal.

2. The curable liquid medium according to claim 1, wherein $R^1$ is selected from the group consisting of a C1-C8 alkyl and a C1-C8 aryl.

3. The curable liquid medium according to claim 1, wherein the ligand is 5,12-dimethyl-1,5,8,12-tetraaza-bicyclo[6.6.2]hexadecane.

4. The curable liquid medium according to claim 1, wherein the iron ion is selected from the group consisting of Fe(II) and Fe(III).

5. The curable liquid medium according to claim 1, wherein the manganese ion is selected from the group consisting of Mn(II), Mn(III), and Mn(IV).

6. The curable liquid medium according to claim 1, wherein the siccative is an iron (II) or iron (III) complex.

7. The curable liquid medium according to claim 6, wherein the siccative is an iron (II) complex.

8. The curable liquid medium according to claim 1, wherein the content of the siccative is between 0.0001 and 0.5% w/w.

9. The curable liquid medium according to claim 1 further comprising 0.001% and 0.1% of at least one antioxidant selected from the group consisting of di-tert-butyl hydroxy toluene, Ethoxyquine, α-tocopherol, and 6-hydroxy-2,5,7,8-tetra-methylchroman-2-carboxylic acid.

10. The curable liquid medium according to claim 9, wherein the composition comprises between 0.002 and 0.05% of at least one antioxidant.

11. The curable liquid medium according to claim 9, wherein the antioxidant is α-tocopherol.

12. The curable liquid medium according to claim 1, wherein the medium contains between 0.001 and 90 wt % of ethylene glycol, diethylene glycol, dipropylene glycol, glycerol, pentaerythritol, dipenta erythritol, neopentyl glycol, trimethylol propane, trimethylol ethane, di-trimethylol propane and 1,6-hexane diol.

13. The curable liquid medium according to claim 12, wherein the medium contains 0.1 and 50 wt % of ethyleneglycol or glycerol.

14. The curable liquid medium according to claim 12, wherein the medium contains 0.3 and 5.0 wt % of ethyleneglycol or glycerol.

15. The curable liquid medium according to claim 1, containing between 0.001 and 2.5% of lead, zirconium, bismuth, barium, vanadium, cerium, calcium, lithium, strontium, and zinc.

16. The curable liquid medium according to claim 1 when cured.

17. The curable liquid medium according to claim 1, wherein the medium is selected from the group consisting of a paint, a varnish, a wood stain, an ink, and a linoleum floor covering.

18. The curable liquid medium according to claim 17, wherein the ink is selected from the group consisting of a metal plate ink, a lithographic ink, a relief printing ink, a screen ink, and an offset overprinting ink.

19. The curable liquid medium according to claim 1, wherein the medium further comprises at least one binder selected from the group consisting of polyacrylates binder and a polyurethane binder.

* * * * *